Figure 1:
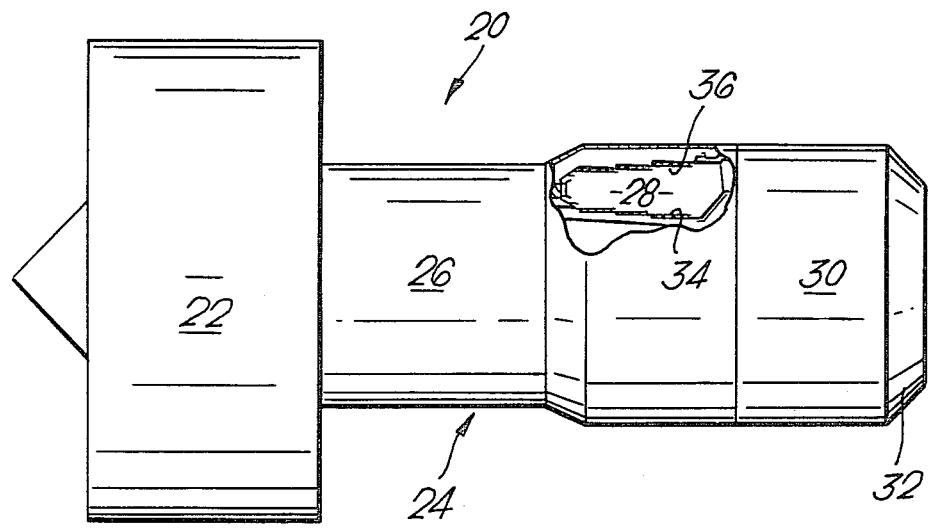

United States Patent [19]

Kwan

[11] 4,382,534
[45] May 10, 1983

[54] MANUFACTURE OF LAMINATED MATERIAL

[75] Inventor: William C. T. Kwan, Derby, England

[73] Assignee: Rolls-Royce Limited, London, England

[21] Appl. No.: 263,195

[22] Filed: May 13, 1981

[30] Foreign Application Priority Data

Jun. 13, 1980 [GB] United Kingdom ............... 8019404

[51] Int. Cl.³ ..................... B23P 17/00; F23R 3/42
[52] U.S. Cl. ................................ 228/161; 228/174; 29/416; 29/418; 144/350
[58] Field of Search ................ 228/161, 170, 174; 29/412, 416, 418, 455 LM; 181/222, 213, 288, 292; 428/120, 137; 144/350; 156/252, 267; 416/97 A

[56] References Cited

U.S. PATENT DOCUMENTS

| | | | |
|---|---|---|---|
| 3,620,643 | 11/1971 | Jones | 416/97 A |
| 4,064,300 | 12/1977 | Bhangu | 428/120 |
| 4,168,348 | 9/1979 | Bhangu | 416/97 A |

Primary Examiner—Kenneth J. Ramsey
Assistant Examiner—Marc Hodak
Attorney, Agent, or Firm—Cushman, Darby & Cushman

[57] ABSTRACT

This invention relates to a method of manufacturing laminated material. Particularly to laminated materials for use in the construction of flame tubes of gas turbine engines.

The laminated material is manufactured from three sheets, a central sheet, a first sheet, and a second sheet. The central sheet is perforated with an arrangement of equi-spaced apertures. The central sheet with apertures is then secured to the first sheet. A number of channels are machined through the central sheet to leave the first sheet and an arrangement of equi-spaced lands secured thereto. The first sheet is perforated with an arrangement of equi-spaced apertures to form air entry holes. The second sheet is then secured to the assembly to form a laminated material comprising a first sheet with apertures and second sheet separated by an arrangement of equi-spaced lands machined from central sheet.

5 Claims, 7 Drawing Figures

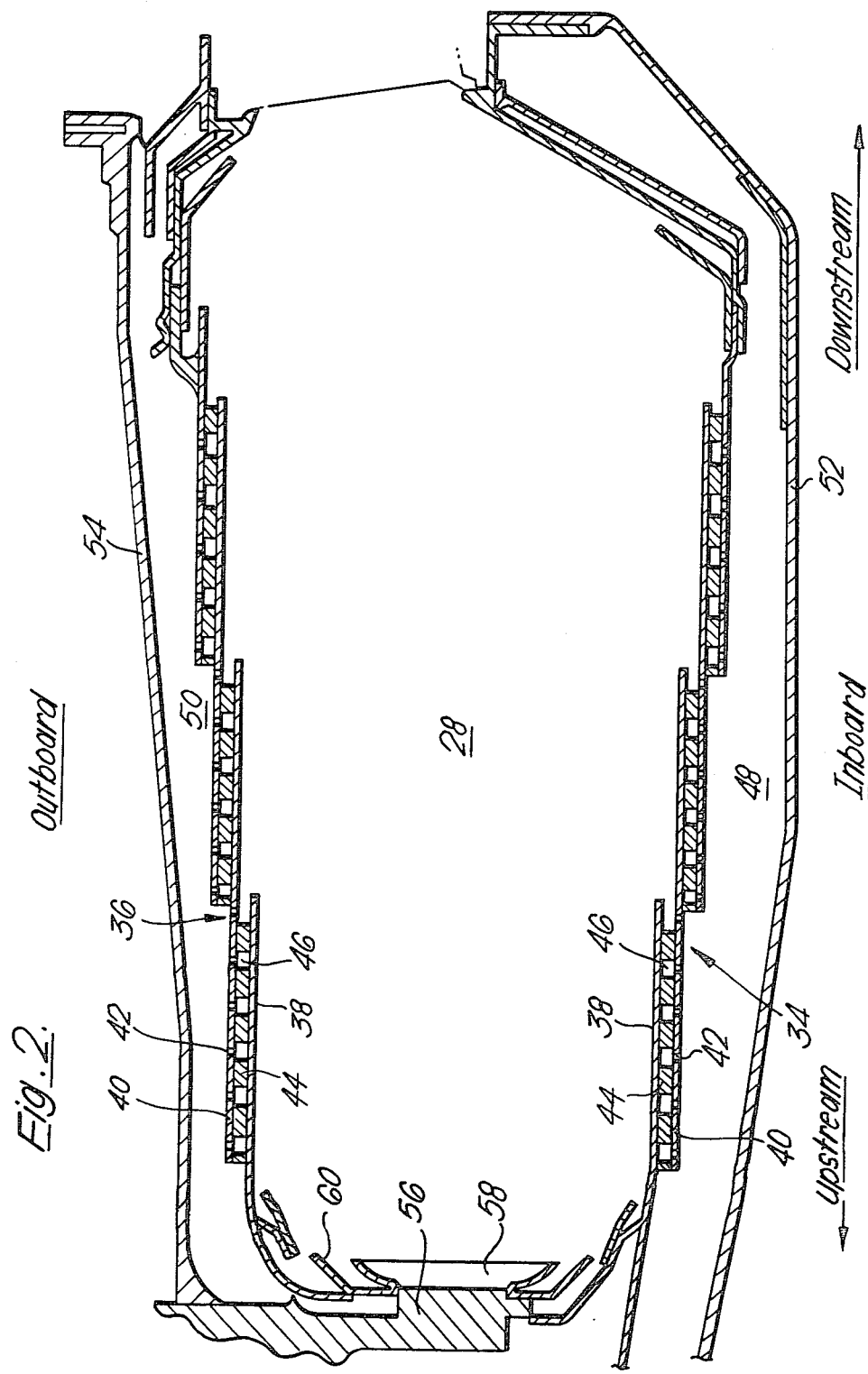

MANUFACTURE OF LAMINATED MATERIAL

This invention relates to a method of manufacturing laminated materials, particularly to laminated materials intended for use in the construction of flame tubes for gas turbine engines.

Flame tubes must be capable of withstanding the high temperatures generated by the combustion of fuel in the flame tube. To meet this requirement it is necessary to cool the flame tube walls using some of the air entering the combustion chamber.

Much work has been carried out on the use of laminated materials for the construction of flame tubes. Some of these laminated materials comprise two sheets, a hot side sheet and a perforate cold side sheet with spacers interposed to separate the two sheets, and to provide internal passages for the through flow of air to cool the hot side sheet.

The present invention is concerned with a method of manufacturing laminated material comprising at least three sheets, for use in the construction of flame tubes for gas turbine engines.

Accordingly, the present invention provides a method of manufacturing laminated material from at least three sheets, a first sheet, a central sheet and a second sheet comprising the following steps;
  (a) perforating the central sheet with a plurality of spaced apertures
  (b) securing the perforate central sheet to the first sheet
  (c) machining channels through the central sheet to form an assembly comprising the first sheet with a plurality of spaced lands secured thereto
  (d) perforating the first side sheet with a plurality of spaced apertures to form air entry holes
  (e) securing the second sheet to the assembly to form a laminated structure, comprising the perforate first and second sheets separated by the spaced lands machined from the central sheet.

Preferably the central and first side sheets are perforated by a punching or sparking or electrochemical process.

The securing of the perforate central sheet to the first sheet, and the securing of the second sheet to the assembly of first sheet and spaced lands, is by brazing or diffusion bonding.

The machining of channels in the central sheet is by gang milling, spark machining or any other suitable method.

The laminated material may be used for the construction of flame tubes for gas turbine engines, where the first sheet is the cold side sheet, and the second sheet is the hot side sheet.

Figure 3:
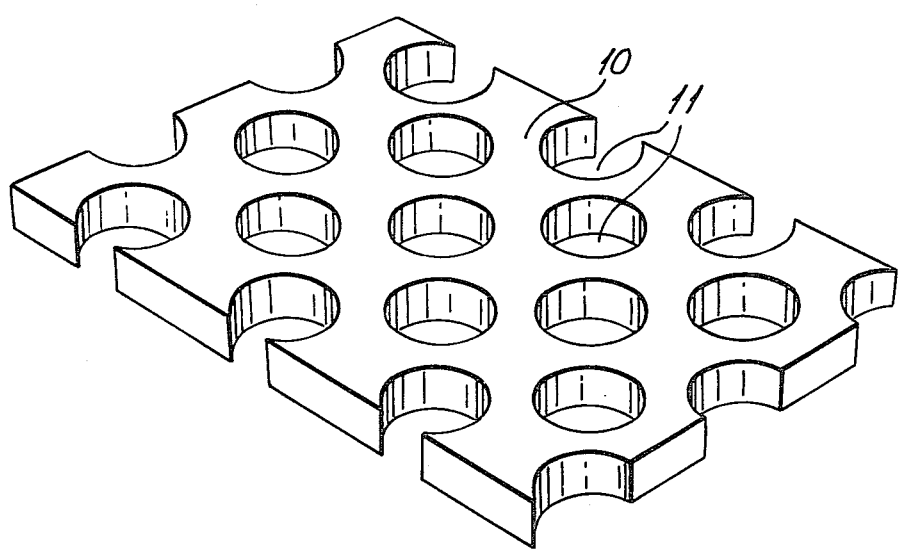
Figure 4:
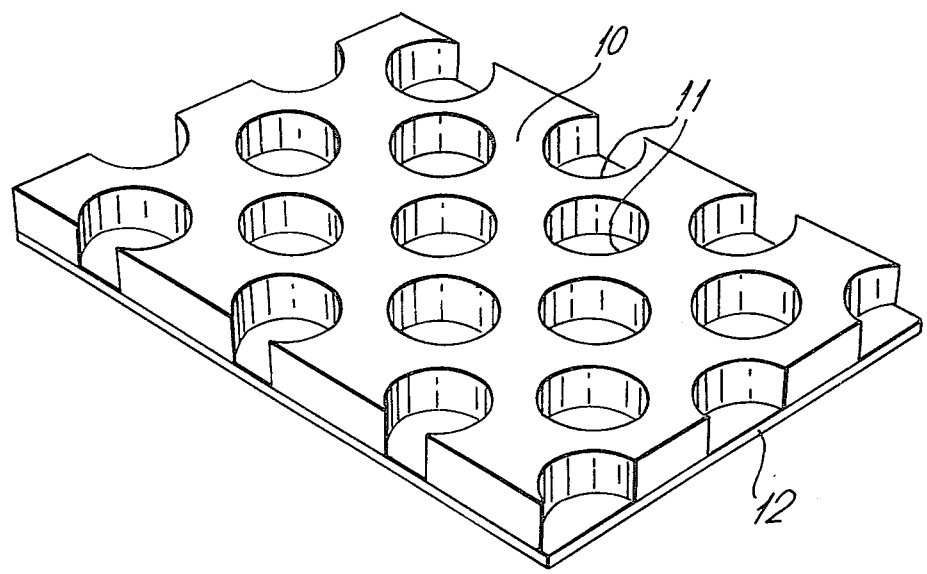
Figure 5:
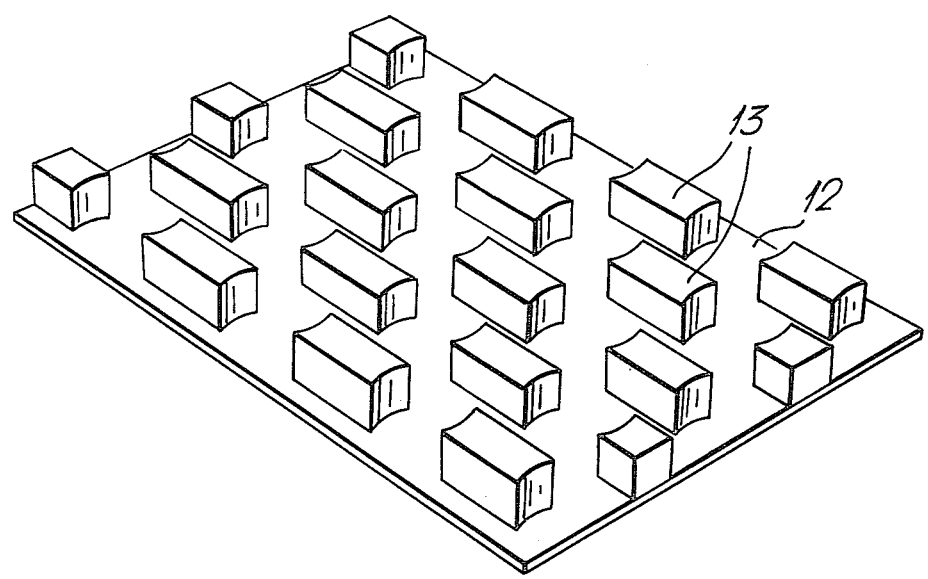
Figure 6:
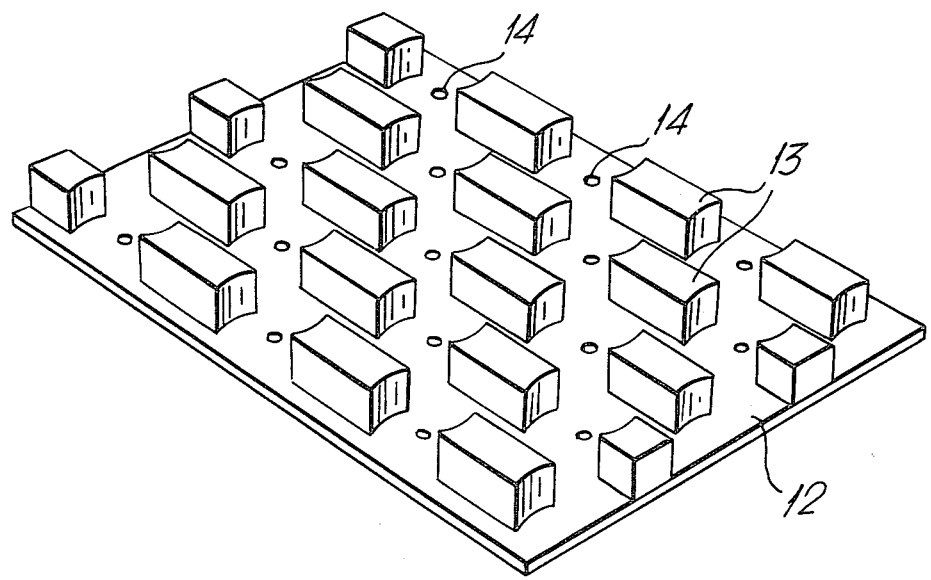
Figure 7:
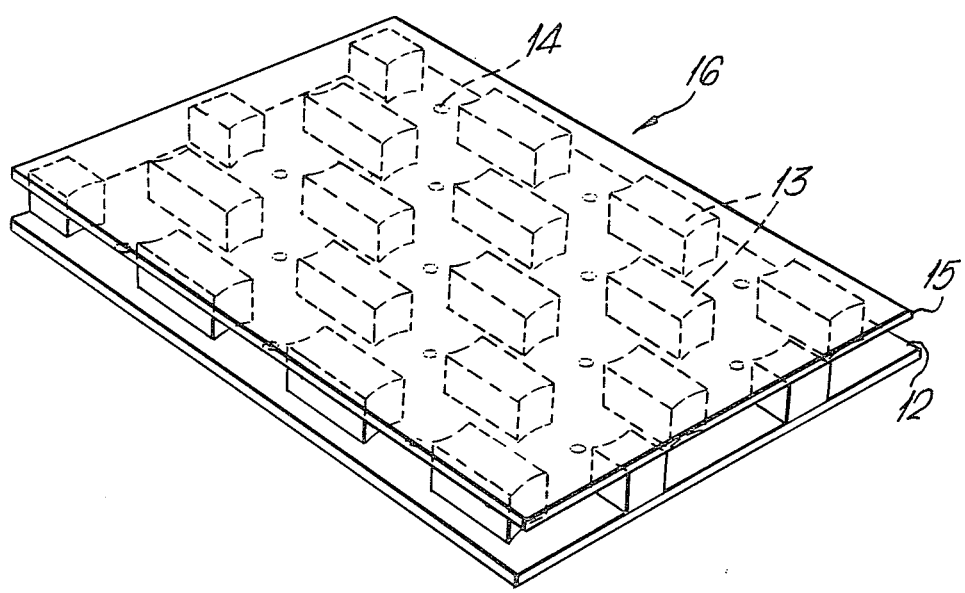

The invention will be further illustrated with reference to the accompanying drawings:

FIG. 1 shows a cut-away view of a gas turbine engine having an annular flame tube comprising walls made from a laminated material made according to the present invention, FIG. 2 shows a cross-sectional view of the annular flame tube in FIG. 1, FIG. 3 shows the central sheet with a plurality of equi-spaced apertures, FIG. 4 shows the perforate central sheet secured to the first sheet, FIG. 5 shows the assembly comprising the first sheet with equi-spaced lands secured thereto, FIG. 6 shows the assembly comprising the perforate first sheet with equi-spaced lands attached thereto and, FIG. 7 shows the resulting laminated structure comprising the perforate first and second sheets separated by the equi-spaced lands machined from the central sheet.

FIG. 1 shows a gas turbine engine 20, comprising a fan 22 and a core engine 24, the core engine 24 comprising a compressor 26, an annular flame tube 28, a turbine 30 and an exhaust nozzle 32. The annular flame tube 28 having an inner and outer annular wall 34 and 36 respectively being made from a laminated material (as shown in FIG. 7).

FIG. 2 shows a cross-sectional view of the annular flame tube 28, the inner and outer annular walls 34 and 36 respectively comprising a hot side sheet 38 and a cold side sheet 40, the annular flame tube 28 having a head 60 at its upstream end. The cold side sheet 40 has a plurality of equi-spaced apertures 42, the hot and cold side sheets 38 and 40 respectively being spaced apart from each other by a plurality of equi-spaced lands 44 and defining a space 46. The space 46 has parallel passages extending in a generally downstream direction. An annular wall 52 is positioned radially inboard of the annular flame tube 28, and an annular wall 54 is positioned radially outboard from the annular flame tube 28. Annular air passages 48 and 50 are formed between the annular wall 52 and the inner wall 34 and between the annular wall 54 and the outer wall 36 respectively. A fuel burner 56 is positioned in an aperture 58 in the head 60 of the annular flame tube 28.

A laminated material 16 as shown in FIG. 7 comprises a perforate first sheet 12 with air entry holes 14, a second sheet 15, and an arrangement of equispaced lands 13 separating the two sheets.

In operation air entering the gas turbine engine 20 flows into the fan 22, the air flow then being divided. A first portion of the airflow called bypass air flowing in an annulus around the core engine 24. The remainer of the airflow called core air flowing into the compressor 26 and being compressed before entering the annular flame tube 28, part of the compressed air being used to cool the annular flame tube 28.

The air entering the annular flame tube 28 through the aperture 58 in the annular flame tube 28 is mixed with fuel injected into the annular flame tube 28 by the fuel injector 56. The air/fuel mixture is ignited and burnt to produce a high energy gas stream. The high energy gas stream flowing out of the annular flame tube 28 in a downstream direction and driving the turbine 30 before leaving the gas turbine engine 20 through the nozzle 32.

The cooling air flowing through the annular air passages 48 and 50 respectively. A portion of the cooling air flowing in the annular air passages 48 and 50 also flowing through the air apertures 42 in the cold side sheet 40 of the inner and outer walls 34 and 36 respectively into the space 46 and then flowing in a downstream direction through the parallel air passages into the annular flame tube 28, the hot side sheet 38 being cooled by the flow of cooling air through the space 46.

The laminated material 16 is manufactured from three sheets, a central sheet 10, a first sheet 12 and a second sheet 15. Initially the central sheet 10 is perforated with an arrangement of equi-spaced apertures 11 as shown in FIG. 3. The central sheet 10 with apertures 11 is then secured to the first sheet 12, as shown in FIG. 4. A number of channels are then machined through the central sheet 10 by gang milling, or other suitable method, to leave the first sheet 12, with an arrangement of equi-spaced lands 13 secured thereto as shown in FIG. 5.

The first sheet 12 is then perforated with an arrangement of equi-spaced apertures to form air entry holes 14, as shown in FIG. 6. The second sheet 15 is then secured to the assembly comprising the first sheet 12 having a plurality of equi-spaced apertures 14 with equi-spaced lands 13 secured thereto to form the laminated material 16 as shown in FIG. 7.

The apertures 11 and 14 made in the central and first sheets (10 and 12) respectively may be made by a number of processes i.e. by a punching, drilling, sparking or an electrochemical process.

The central sheet 10 with apertures 11 may be secured to the first sheet 12, and the second sheet 15 may be secured to the assembly comprising the first sheet 12 having equi-spaced apertures 14 and having equi-spaced lands 13 secured thereto, by diffusion bonding or brazing.

The channels may be machined through the central sheet 10 by gang milling, chemical machining or spark machining.

Although the description and drawings refer to a laminated material constructed from three sheets, it may equally well be made from more than three sheets.

I claim:

1. A method of manufacturing laminated material from at least three sheets, a first sheet, a central sheet and a second sheet, comprising the following steps:

(a) perforating the central sheet with a plurality of spaced apertures, (b) securing the perforate central sheet to the first sheet, (c) machining channels through the central sheet to intersect said apertures thereby forming an assembly comprising the first sheet with spaced lands secured thereto, (d) perforating the first sheet with a plurality of spaced apertures to form air entry holes, (e) securing the second sheet to the assembly to form a laminated structure, comprising the perforate first sheet and second sheet separated by the spaced lands machined from the central sheet.

2. A method of manufacturing a laminated material according to claim 1 where the perforating of the central and first sheet is carried out by punching, drilling, sparking or by an electro-chemical process.

3. A method of manufacturing a laminated material according to claim 1 where the securing of the perforate central sheet to the first sheet, and the securing of the second sheet to the assembly of first sheet and spaced lands is by brazing or by diffusion bonding.

4. A method of manufacturing a laminated material according to claim 1 where the machining of channels in the central sheet is by gang milling or chemical machining or spark machining.

5. A method of manufacturing a laminated material as claimed in claim 1 in which the apertures in the first and central sheets are uniformly spaced.

* * * * *